United States Patent [19]

Miller

[11] Patent Number: 4,804,327

[45] Date of Patent: Feb. 14, 1989

[54] MAGNETIC TRACING APPARATUS

[76] Inventor: Sidney H. Miller, 850 E. Louther St., Carlisle, Pa. 17013

[21] Appl. No.: 151,543

[22] Filed: Feb. 2, 1988

[51] Int. Cl.[4] .................. G09B 19/00

[52] U.S. Cl. .................. 434/409; 434/88

[58] Field of Search .................. 434/409, 88

[56] References Cited

U.S. PATENT DOCUMENTS 2,589,601 3/1952 Burnett .................. 434/409

3,585,735 6/1971 Miller .................. 434/409

*Primary Examiner*—William H. Grieb

*Attorney, Agent, or Firm*—C. Hercus Just

[57] ABSTRACT

A magnetic tracing apparatus comprising an enclosure within which a mixture of nonmagnetic particles and magnetically attractive fragments are contained, at least one surface member of the enclosure being provided for the formation of a design image upon the inner surface upon it by causing the aforementioned mixture of materials to be attracted to the inner surface, and a permanent magnetic tracing device being provided for movement over the outer surface of the member and cause magnetically attractable fragments in the aforementioned mixture to be attracted to the tracing device to remove the attached mixture of particles and fragments from the inner surface of the member as moved along the outer surface of the member and fall therefrom; the principal improvement being the inclusion of supports of a number of different types which are attached in various ways to the enclosure and are operable to move the enclosure about at least one axis to agitate the mixture within the enclosure and thereby destroy the aforementioned design image and re-establish an uninterrupted layer of the mixture upon the inner surface of the aforementioned one surface member of the enclosure.

45 Claims, 3 Drawing Sheets

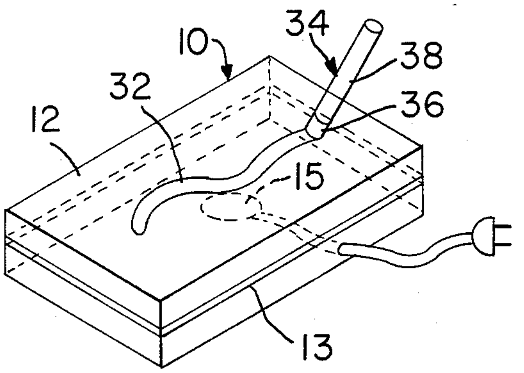
FIG. 8
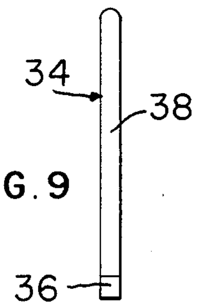
FIG. 9
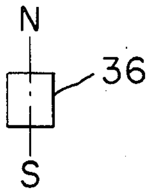
FIG. 9a
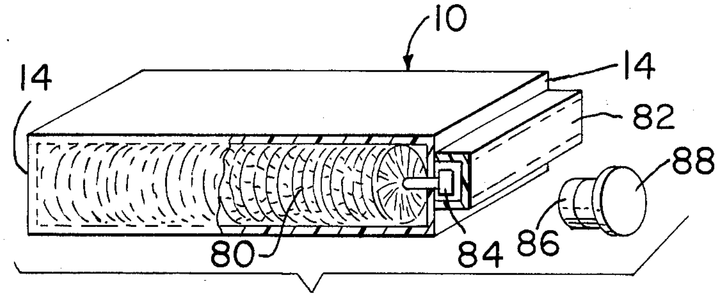
FIG. 10
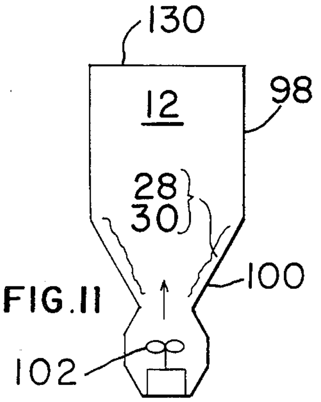
FIG. 11
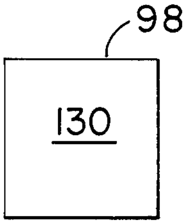
FIG. 11A
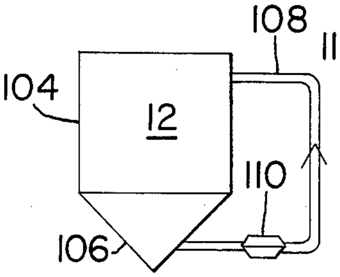
FIG. 12
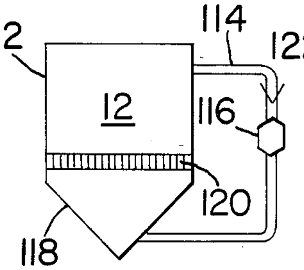
FIG. 13
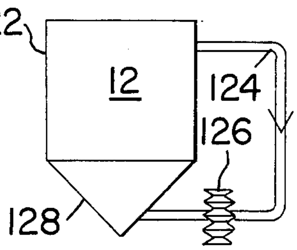
FIG. 14
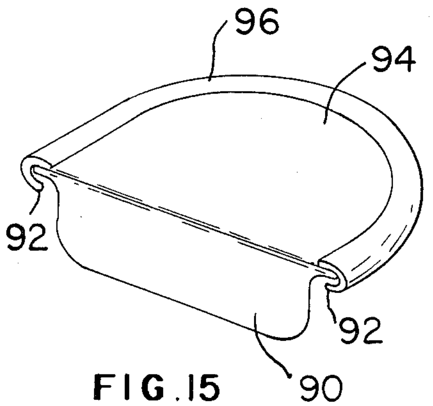
FIG. 15
FIG. 16
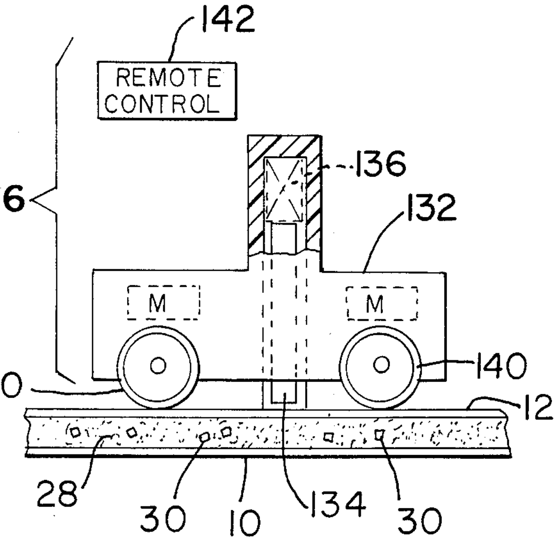

MAGNETIC TRACING APPARATUS

BACKGROUND OF THE INVENTION

The present invention essentially is an improvement over, as well as an extensive projection of the invention over the concept comprising the subject matter of applicant's prior U.S. Pat. No. 3,585,735, dated June 22, 1971, which is the closest prior art presently known to the applicant. The apparatus is susceptible to use in a variety of situations and adaptable to various devices, including toys, amusement devices, sign-making equipment, blackboard and whiteboard devices, score-keeping, advertising devices, as a teaching aid, and even as a notepad or the like. Applicant's prior device included a relatively flat enclosure within which a mixture of nonmagnetic particles and magnetically attractive fragments are disposed. A pair of planar, flat panels comprise the top and bottom of the enclosure and preferably are formed from plastic material. In order to arrange the device for operation, it is necessary to invert the device in order to dispose said mixture of particles and fragments upon the inner surface of the panel upon which an image is to be designed or formed. Then the device is restored to its initial position and a magnetic-type writing device is moved over the upper outer surface in order to establish a design thereon by causing certain of the magnetically attractive fragments to be moved by the magnetic writing member and cause the nonmagnetic particles disposed against the inner surface of the upper planar member to be removed and dropped therefrom, thus forming a visible design. The purpose of the present invention is to eliminate the need to initially invert the enclosure as described in the patent and otherwise greatly expand the use of the basic principle of the present invention over that of the prior patent.

SUMMARY OF THE INVENTION

It is the principal object of the present invention to provide a number of different shapes of enclosures for a mixture of primarily nonmagnetic particles and magnetically attractive fragments which are sealed within the enclosure, the enclosure including at least one surface upon which a design image is to be drawn by movement of a magnetic writing member over the outer surface of the enclosure, and thus, remove from the inner surface thereof particles and fragments adhering thereto and thus establish a traced design by means of the removed material falling from the inner surface of the member over which the magnetic writing device has been moved; the primary improvement over the prior art comprises the inclusion of support means for the enclosure in order that the same simply may be moved about a single axis, in the preferred embodiments of the invention, in order that the traced design or image may be destroyed and a substantially uniform layer of the mixture of materials and fragments being disposed upon the inner surface of the face of the enclosure upon which the design had been visible.

Another object of the invention is to mount a substantially rectangular enclosure of limited thickness within which the mixture of particles and fragments are contained and hingedly connect one edge of said enclosure to, for example, a flat supporting panel attachable to a wall or other supporting surface whereby the so-called writing surface of the enclosure may be disposed vertical and parallel to the supporting member and, when it is desired to destroy the design and re-establish the writing surface, it is only necessary to pivotally move the enclosure about the axis of the hinges in opposite directions, a number of times, and thereby re-establish a substantially even layer of the mixture upon the inner surface of the outer panel of the enclosure.

One further object of the invention is to mount a rectangular version of the enclosure within a complementary frame and support the enclosure upon trunnions movable relative to opposite sides of the frame and thus, permit the enclosure to be rapidly moved in opposite rotary directions through arcs of as much as 360°, and thereby destroy any image previously formed upon a surface of the enclosure and re-establish an even layer of the mixture of particles and fragments upon one surface thereof.

As an adjunct to the aforementioned object, it is a further object to support said frame upon a free-standing pedestal or the like of suitable height to enable the enclosure to be conveniently drawn upon to establish designs.

Another object of the invention is to form the enclosure somewhat in the nature of a balloon comprising a flexible cylinder or the like, having appropriate ends and containing a fluid, gaseous or otherwise, under pressure in order to maintain the desired shape of the enclosure, and support one end of the enclosure for rotation within the bearing in a vertical support member, for example, or otherwise.

Still another object of the invention is to form the enclosure in the nature of a cylinder having transverse ends and preferably formed from rigid plastic material within which the mixture of fragments and particles are contained, preferably being introduced through a hollow tubular neck in one end of the enclosure, the opposite end thereof also having a trunnion formed thereon coaxially with said neck and support said tubular neck and trunnion respectively in spaced vertical members respectively connected to a base disposable upon the supporting surface, such as a table or otherwise, and if desired, a carrying handle may extend between the upper ends of the supporting members.

A further object of the invention is to form, for example, a square or rectangular enclosure having opposite parallel surfaces, one of which is to have an image formed thereon and dispose the same upon a colored or tinted panel, either with or without lighting means therebeneath, whereby when a design is traced upon the upper surface of the enclosure, the lighted colored panel will be visible through the design traced upon the upper surface of the enclosure.

Other objects of the invention are to provide various means described in detail hereinafter by which removal of the particles from the inner surface of the writing panel may be facilitated, thereby contributing in various ways to the formation of more attractive images and clearer outlines thereof upon the upper surface of the panel upon which the design is formed.

Still another object of the invention is to form an enclosure having opposite planar top and bottom members connected by sealed sidewalls and one of said walls including an interior channel along which a magnet which is connected to one end of a rotatable brush extending across the interior of the enclosure is capable of being moved from one end of said enclosure to the other interiorly by means of the magnet connected to one end of the brush being attracted to an exterior magnet movable along the outer wall of said interior channel and thereby not only move the brush as indicated, but also rotate the same due to the magnetic attraction of one magnet to the other.

Still another object of the invention is to provide automatic means operable by remote control for forming an image upon one surface of an enclosure of the type described above, which preferably is planar, the magnetic writing device being contained in a body having wheels with magnetic rims movable over the surface upon which the design is to be visible, said magnetic rims being attracted to magnetic attractive elements being disposed in the plastic material comprising the writing surface of the enclosure and, as an adjunct to this, another improvement comprises the formation of a very thin, relatively transparent magnetically attractive sheet over the surface of the enclosure upon which an image is to be formed by said mobile writing device for engagement of the magnetic rims of the wheels of the mobile device with said thin transparent magnetically attractive sheet affixed to the so-called writing surface of the enclosure.

One further object of the invention is to mount a substantially rectangular enclosure of the type described hereinabove between opposite parallel, horizontal guide members and rapidly reciprocate the enclosure along said guide means by mechanical means, such as a rotatable crank member, operated by a suitable motor and thus, rapidly agitate the mixture of material within the enclosure in order to destroy an image previously formed thereon and re-establish a uniform layer of particles and fragments of the material within the enclosure.

As an adjunct to the foregoing object, it is another object to provide a rectangular enclosure with a set of vertical guide members mounted on a common support, the guide members engaging the corners of the enclosure and mechanical means, such as a motor-driven shaft with rotatable crank members on opposite ends thereof respectively are connected to links pivotally, engaging opposite sides of the enclosure and thus, effect movement of the enclosure upon an axis vertical to the plane thereof and thereby agitate the mixture of particles and fragments of material within the enclosure to destroy the design and re-establish a uniform layer thereof within the enclosure.

Details of the foregoing objects and of the invention, as well as other objects thereof, are set forth in the following specification and claims and illustrated in the accompanying drawings comprising part of the present invention.

BRIEF DESCRIPTION OF THE DRAWINGS

FIG. 8 is a perspective view of the enclosure shown in FIGS. 1–4 in process of having a design formed therein by use of a magnetic tracing device, the enclosure being disposed upon a thin colored panel which overlies light means which illuminates the color of said panel through the figure formed upon the upper face of the enclosure.

FIG. 9 is a side elevation of a magnetic tracing device having a permanent magnet mounted on one end thereof.

FIG. 9*a* is an illustration showing the magnetic axis of the permanent magnet, which axis is coaxial with the handle of the tracing device shown in FIG. 9 when attached thereto.

FIG. 10 is a partially sectioned view of an enclosure within which a brush is movable by magnetic means to distribute particles within the enclosure.

FIGS. 11–14 respectively show different embodiments of mechanism for establishing a cloud-like arrangement of the mixture of particles and fragments within an enclosure to form a deposition of a continuous layer thereof against the inner surface of the front writing face of the enclosure.

FIG. 11A is a top plan view of the embodiment shown in FIG. 11.

FIG. 15 is a further embodiment of enclosure having a writing face comprising a stretched thin film of plastic material against the inner surface of which particles and fragments of intermixed materials are adapted to adhere for formation of designs and images on the outer surface of the film by use of a magnetic tracing device.

FIG. 16 is a side elevation of a motor-driven magnetic tracing device adapted to be moved and adhered to the front face of a fragmentarily illustrated enclosure, movement of the motorized device being effected by a remote control unit associated by radio or otherwise with the unit for the development of figures and images upon the outer surface of the enclosure.

DETAILED DESCRIPTION OF THE PREFERRED EMBODIMENTS OF THE INVENTION

Figure 1:
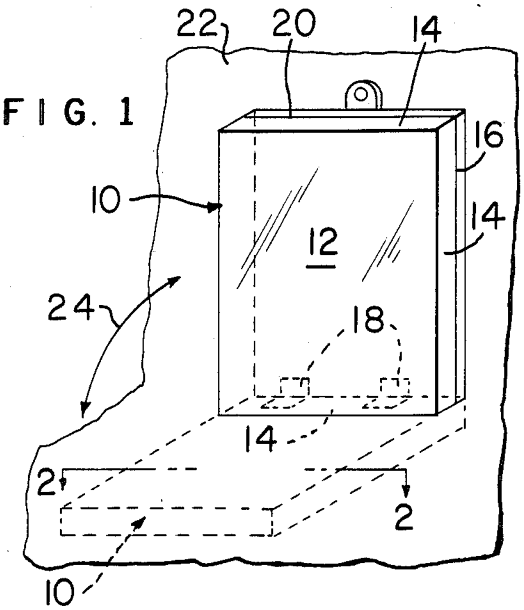
FIG. 1 illustrates in full linesone embodiment of rectangular enclosure upon the front face of which a design or image may be formed by magnetic means while, for example, the same is mounted vertically upon a suitable supporting surface and, in phantom, the enclosure is shown as having been moved about an axis of hinges in opposite directions sufficiently to redistribute the particles within the enclosure in a continuous layer against the inner surface of the front face of the enclosure.

FIG. 1 shows one embodiment of enclosure 10 supported in substantially vertical position and in which the front face 12 thereof comprises the so-called writing surface upon which an image or figure is to be formed by the apparatus as described hereinafter. The enclosure 10 may be formed of nonmagnetic material, such as a preferably rigid synthetic resin or plastic of suitable nature. Extending from all edges of the front face 12 are side members 14 which are rigidly connected to the edges of the front face and the opposite edges of the side members 14 are rigidly connected to a rear panel 16, said rear panel and all of said side members being formed of the same material as the front face 12. In the preferred construction of this embodiment, the lower side member 14 has one leaf of each of the hinges 18 connected thereto and the opposite leaves are fixed to the lower portion of a supporting panel 20 which, for example, may be hung upon a wall surface 22, shown fragmentarily in FIG. 1. This embodiment of the invention thus is one which is mounted for movement about the pivot of the hinges 18 in order that it may be moved from the full line position shown in FIG. 1 to the phantom position thereof, as indicated by the arrow 24, for purposes to be described.

Figure 2:
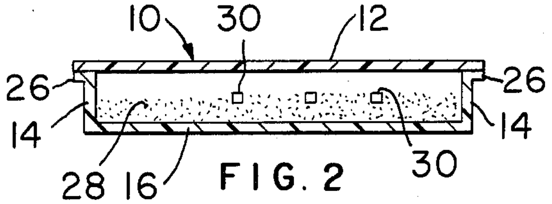
FIG. 2 is a transverse sectional view as seen on the line 2—2 of FIG. 1 and illustrating a mixture of non-magnetic particles and magnetic attractive fragments intermixed within the interior of the hollow enclosure.

Referring to FIG. 2, which comprises a transverse sectional view taken midway through the enclosure 10, as seen on the line 2—2 of FIG. 1, the side members 14 have flanges 26 along the upper edges which are connected by cement or otherwise to the peripheral edges of the front face member 12. Disposed within the enclosure 10 is a mixture of nonmagnetic particles 28 within which a number of magnetically attractive fragments are admixed. Preferably the magnetically attractive fragments 30 comprise small pieces of permanent magnets but other compositions or compounds which are magnetically attractive also can be used.

To distinguish the present invention over applicant's prior U.S. Pat. No. 3,585,735, it is to be noted that in the structure of said prior patent, there is an enclosure similar to the present enclosure 10 and a similar mixture of particles and fragments are enclosed therein; however, in the operation of said device of the prior patent, it was essential initially to invert the enclosure or container as termed in the prior patent, in order to dispose said mixture of material against the inner surface of the normally upper panel which is the writing surface. Then, the enclosure is turned over to provide the writing surface uppermost, and such initial inverting of the container was essential, according to the operation of said prior device. It now has been found that there is no need to invert the enclosure 10 to present the mixture in operative relationship relative to the front face or writing panel 12, which comprises the area upon which images and designs are to be formed in accordance with the invention. Instead of such inversion, as in said prior patent, it is only necessary to pivotally move the enclosure a few times, preferably rapidly, about the axis of the supporting hinges 18 so as to arrange the mixture of particles and fragments 28 and 30 upon the inner surface of the front face panel 12 wherein it is in position to have an image or design 32 formed thereon as illustrated, for example, in FIG. 8, by means of a magnetic tracing device 34 which, in the preferred embodiment of the invention, comprises a permanent magnet 36 affixed to one end of the preferably elongated handle member 38 of the device 34. In moving the tracing device 34 over the front face 12, for example, of the enclosure 10, the magnetic attractive fragments 30 of the mixture within the enclosure 10 are attracted closely against the inner surface of the front face 12 of enclosure 10 and then, by moving the magnet 36 along the outer surface of front face 10, said magnetically attractive fragments 30, in effect, scrape or dislodge from the inner surface of front face 12, all of the mixture subjected to the force of the magnet 36 and thus creates the design or image 32, shown in FIG. 8, as an example of such operation. Such formation of a design or image will occur whether the enclosure 10 is disposed in a horizontal or vertical position or any position inbetween, relative to the axis about which the enclosure is rotated.

Thus, it will be seen that not only is the invention concerned with the arrangement of a layer of the mixture of particles 28 and fragments 30 in a layer against the inner surface of the front face 12, but it also is concerned with forming a design or image, such as the exemplary illustration 32, but even more importantly, the invention is concerned with destroying the image 32 by a simple series of movements about the pivot along which the enclosure is mounted in order to re-establish the uniform layer of said mixture against the inner surface of the front face 12.

Figure 3:
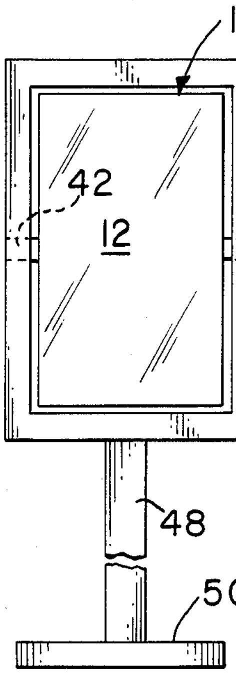
FIG. 3 shows a vertical elevation of an enclosure disposed within a rectangular frame and adapted to be pivotally moved about the axis of trunnions which connect the enclosure to the frame and a free-standing pedestal, shown in foreshortened manner, is connected to the lower portion of said frame.
Figure 4:
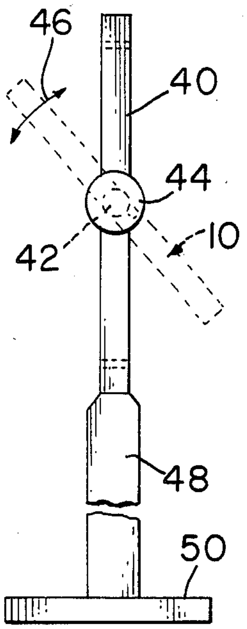
FIG. 4 is a side view of FIG. 3 and shows in phantom an arcuate position to which the enclosure has been moved with respect to the frame for purposes of re-establishing a continuous layer of the particles within the frame as aforesaid.
Figure 4A:
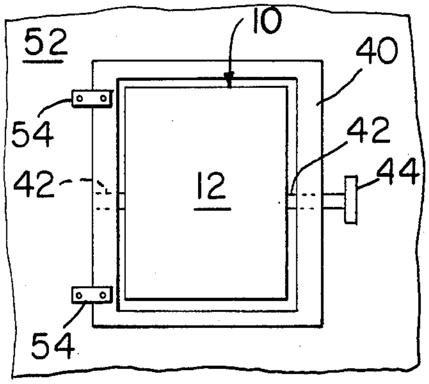
FIG. 4A is a modification of the mounting of the enclosure shown in FIGS. 3 and 4.

There are other ways in which the enclosure 10 may be supported for movement about an axis than the means shown in FIG. 1. For example, in FIG. 3, the enclosure 10 is supported within a complementary frame 40 and is arranged for rotation within said frame upon the axis of a pair of aligned trunnions 42, which are connected to the enclosure 10 and extend through suitable bearings in the opposite side members of frame 40, as clearly shown in FIG. 3. Preferably, one of the trunnions 42 has a manually operable knob 44 affixed thereto, whereby said knob may be manually operated to rotate the enclosure 10 about the axis of the trunnions 42, even for a full rotation of 360°, if desired, or in a plurality of arcs in opposite directions, as indicated by the arrow 46, preferably rapidly a limited number of times. This operation will also redistribute the particles and fragments within the enclosure 10 in even relationship along the inner surface of the front face 12 of enclosure 10. If desired, the frame 40 may be mounted upon a free-standing pedestal member 48, shown in shortened manner in FIGS. 3 and 4, and arising from a base 50 which may be supported upon a floor surface or the like. Another way of supporting the frame 40 is illustrated in FIG. 4A, in which it will be seen that the frame 40 is disposed adjacent a vertical wall 52, for example, illustrated fragmentarily in FIG. 4A, and a pair of hinges 54 are connected respectively to one side of the frame 40 and the wall 52, whereby the frame 40 and enclosure 10 supported therein may be pivotally moved about the axis of the hinges 54 to dispose the frame 40 perpendicular to the wall surface 52, and in which position the knob 44, for example, may be utilized to rotate the enclosure 10 about the axis of the trunnions 42, as described above with respect to the structure in FIGS. 3 and 4.

Figure 5:
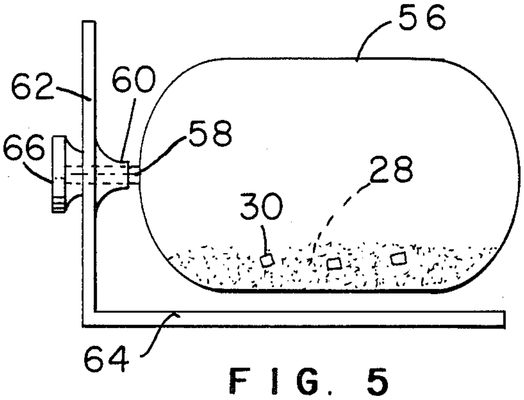
FIG. 5 illustrates another embodiment of enclosure which is of a thin walled inflatable nature supported for rotation upon a vertical member to re-establish a desired layer of the mixture material around the inner surface of said inflated member.

Other shapes of the enclosure for the mixture of particles and fragments 28 and 30 may be employed from those shown in FIGS. 1–4. For example, a simplified illustration of enclosure 56 is illustrated in FIG. 5, and in which the enclosure is formed of relatively thin flexible plastic material or the like and within which a mixture of nonmagnetic particles 28 and magnetically attractive fragments 30 are contained, preferably under pressure of fluid, such as air or other appropriate gas, which may be introduced through an opening 58 formed longitudinally within a trunnion-like neck 60, which extends through a bearing in an upright support member 62, which extends upward from base 64. The neck 60, after introduction of fluid under pressure has been introduced to the interior of the enclosure 56, is sealed and closed by closure 66, which also serves as a means by which the enclosure 56 may be rotated about the axis of the neck 60 to distribute the particles and fragments 28 and 30 evenly along the inner surface of enclosure 56, whereby designs or images may be formed upon the outer surface of the enclosure by use of the magnetic tracing device 34 to produce any desired configurations of design, after which the designs may be destroyed by rotating the enclosure 56 in opposite rotary directions or otherwise, as desired, to effect an even distribution of the mixture of materials enclosed therein and thus, reestablish a substantially even coating of the inner surface of the enclosure 56 with said mixture to ready the same for the formation of other designs or images.

Figure 6:
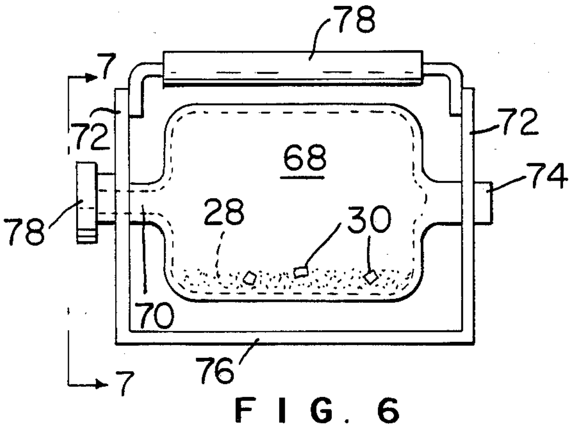
FIG. 6 is a side elevation similar to FIG. 5, but illustrating a relatively rigid walled enclosure having trunnion-like means at opposite ends, supported respectively in vertical members extending upward from a base and having a carrying handle connected between the upper ends of said vertical members.
Figure 7:
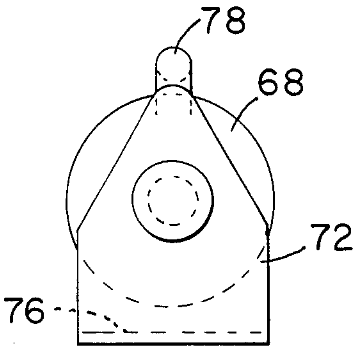
FIG. 7 is a side elevation of FIG. 6.

Referring to FIG. 6, another embodiment of enclosure 68 is shown which, for example, may be formed by blowing operations or otherwise from heated plastic material, for example, and then permitting the same to chill and be rendered rigid to contain the mixture of particles 28 and fragments 30 which may be introduced through a hollow neck or trunnion 70 which extends through a bearing in one upright support member 72, while a trunnion 74 is formed on the opposite end of the enclosure 68 and extends through a complementary bearing in another upright support member 72, both of said support members 72 respectively being affixed to a base member 76. To facilitate the transport of the embodiment of enclosure 68, shown in FIG. 6, a handle 78 may be provided and the opposite ends thereof affixed to the upper ends of the upright support member 72, thus conveniently rendering the enclosure 68 readily transportable for use as a toy, game, or otherwise, and upon the outer surface of which designs and images may be formed by the use of the magnetic tracing device 34. After the designs or images are no longer of use, they may be destroyed and the distribution of the mixture of particles and fragments 28 and 30 may be re-established in even manner along the interior surface of the enclosure 68 by rotating the combination closure and knob 78 secured to the outer end of the hollow neck or trunnion 70 which closes the same, and thus prevents discharge of any of the enclosed material from the interior of the enclosure.

Referring to FIGS. 9 and 9*a*, wherein exemplary magnetic tracing device 34 is shown, it will be seen that it comprises an elongated handle member 38, upon the lower end of which a permanent magnet 36 is affixed. Preferably, magnet 36 is affixed to the end of the handle 38 with the magnet axis of orientation coaxial with said handle, whereby the magnetic force of said magnet is applicable when the device is between a perpendicular relation to the drawing area and up to 30 degrees from said perpendicular relationship.

Another embodiment of enclosure 10 is illustrated in FIG. 10 in which a rotary brush 80 is disposed within the interior of said enclosure and extends between opposite sides 14 thereof, one of said sides having an interior channel member 82 formed therein within which preferably a permanent magnet 84 is affixed to one end of the brush 80 and is adapted to be moved longitudinally within the channel member 82 by means of another permanent magnet 86 which is mounted on one end of a knob 88, the magnet 86 being adapted to be moved along the exterior surface of the interior channel 82, and thus, attract the magnet 84 thereto for movement within the interior of the enclosure 10 and, if desired, the brush may be rotated by means of rotating the knob 88 in view of the magnetic attraction of the magnets 84 and 86 for each other and thus, permitting such rotation.

Referring to FIG. 15, another form of enclosure 90 may be formed from appropriate plastic, for example, and provided with a flanged rim 92 around which edges of a relatively thin, tough plastic sheet 94 are extended, as shown in cross-section in said figure and a clamping member 96 enclosed the edges of the sheet 94 to retain the same in stretched condition. It will be understood that the enclosure shown in FIG. 15 is illustrated in section and any desired shape other than that illustrated may be employed in the formation of the enclosure 90. The plastic film 94 has a tensile stress within the range of between 1 and 50,000 lbs/square inch. One suitable material from which the plastic film 94 may be formed is merchandised under the trademark "MYLAR".

For purposes of preferably enhancing the separation of the nonmagnetic particles 28 from the interior surface of the so-called writing face of any of the enclosures described hereinabove, as the magnetic tracing device is moved along the outer tracing surface of the enclosure, the inner surface of any of the enclosures thus far described may be coated with an antistat agent, whether chemical or metallic, or a combination thereof. Also, the nonmagnetic particles 28 may be composed of expanded or unexpanded foam plastic selected from the class comprising polyethylene, polystyrene, polyvinyl chloride, and similar plastics. Further, the magnetically attractive fragments 30 or other magnetically attractive fragments contained in the mixture with the nonmagnetic particles 28 is within the range between 0.0001% and 95% of the total mixture. In addition, the pulverulent nonmagnetic material may also be coated with an antistat substance to facilitate the separation of the particles from the inner surface of the enclosure as the magnetic tracing device 34 is moved over the outer surface of the enclosure, thereby rendering the design or image 32 or otherwise, very sharp and distinct. The pulverulent nonmagnetic particles 28 may comprise one or a mixture of the following materials: brass, bronze, carbon, ceramic material, chrome, clay, copper, copper oxide, iron oxide, nickel, silica, stainless steel, tin and zinc, either individually or in mixtures thereof, and if desired, may be combined with one or a combination of saturated fatty acid, unsaturated fatty acid, wax, polymers, and suitable chemicals.

The present invention also includes examples of embodiments of enclosures in which the mixture of non-magnetic and magnetically attractive particles within the enclosure may be distributed by circulation of fluid, preferably gaseous, such as air or inert gas, and examples of these additional enclosures and particle-agitating means are illustrated respectively in FIGS. 11–14.

The present invention also contemplates the use of color. By referring to FIG. 8, the enclosure 10 is shown in overlying relation to a translucent colored panel 13 which overlies a compartment within which light means 15 are mounted, whereby the color of panel 13 appears through the design or image 32 as the same is developed.

Referring to FIG. 11, enclosure 98 may be of a generally rectangular nature and includes a front face 12 upon which a design or image is to be formed by use of the magnetic tracing device 34, for example. In the event the mixture of particles and fragments 28 and 30 are lodged in the lower conical portion 100 of enclosure 98, they may be distributed by agitating the same by means of a fan 102, which blows the particles and fragments upward to cause them to be distributed along the inner surface of the front face 12 and thus be adapted for use in the formation of a design or image upon the outer surface of the front face 12.

The embodiment shown in FIG. 12 comprises an enclosure 104 having a front face 12 and a lower accumulating member 106. A preferably gaseous fluid, such as air or inert gas, is contained within the enclosure 104, either under pressure or otherwise, and the conduit 108 is connected to the lower member 106 and extends through a pump or fan 110, which is mounted within the conduit 108 and is introduced into the upper portion of enclosure 104 in somewhat of a cloud-like manner for adherence to the inner surface of the front face 12, and thus be ready for the formation of a design or image therein by use of the magnetic tracing device 34.

Still another embodiment of enclosure 112 is shown in FIG. 13 upon which a front face 12 is mounted and a conduit 114 extends from the upper portion of enclosure 112 and descends through pump or fan 116 and enters the lower portion 118 to blow through any accumulated material therein and project the same upwardly through perforated plate 120 and thus effect a wide distribution, somewhat cloud-like, of the material within the enclosure 112 for deposition of the same upon the inner surface opposite the front face 12, and thus be ready for designs or images to be formed upon the face 12 by use of the magnetic tracing device 34.

Still another embodiment of enclosure 122 is shown in FIG. 14 in which one end of a conduit 124 is connected to the upper portion of the enclosure 122 and extends downwardly for communication with a bellows unit 126 and from there to the lower portion 128 of enclosure 122. Operation of the bellows will effect movement of the preferably gaseous-distributing medium from the lower portion 128 upwardly within the enclosure 122 and thus cause the material to be distributed substantially in an even layer upon the opposite, interior surface of front panel 12 upon which a design or image is formed by use of the magnetic tracing device 34.

If desired, referring to FIG. 11A, which is a top plan view of enclosure 98, shown in FIG. 11, the top surface 130 thereof may be used as the writing surface and against the inner surface of which the pulverulent material and otherwise is distributed for effecting a design or image upon the outer surface 130 of the enclosure 98.

Figure 20:
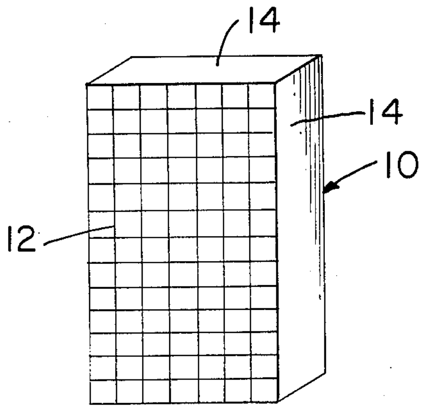

Also, it is contemplated by the present invention to use preferably remote controlled magnetic tracing means which is movable automatically over, for example, the fragmentarily illustrated portion of enclosure 10, illustrated in FIG. 16. Referring to said figure, it will be seen that a motorized carrier 132 includes a magnetic tracing device 134, the magnet of which is forced by a compression spring 136 against the front face 12, for example, of enclosure 10. The carrier 132 has wheels 138, which are motor-driven and have magnetic rims 140 which, referring to FIG. 20, are attracted to magnetic attractive members incorporated within the plastic from which front face 12 is manufactured, preferably near the outer surface thereof, and thereby causing the motorized carrier 132 to be movable over the front face 12 and attached to rt even if the face 12 is disposed vertically. In FIG. 16, a remote control unit 142, of radio-type or otherwise, is illustrated to control the movement of motorized carrier 132. The magnetic rims 140 of the carrier 132 maintain the same in contact with the front face 12 of enclosure 10, even though mounted vertically due to magnetically attractive elements 144 incorporated within the plastic material of front face 12.

Figure 19:
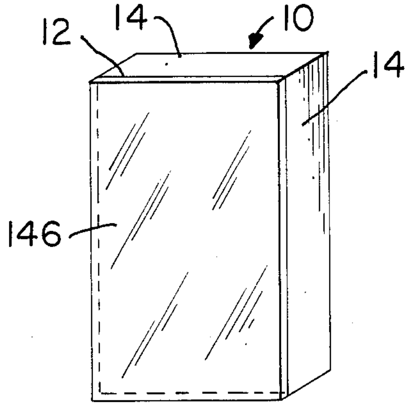
FIGS. 19 and 20 respectively show different types of magnetically attractive means formed upon or closely within the front face of the enclosure with respect to which the motorized writing unit is adapted to be maintained in connection with the surface of said front face of the enclosure.

Referring to FIG. 19, in which another embodiment of magnetic attractive means are shown upon the enclosure 10, it will be seen that the front face is covered by a thin transparent metallic film 146 which is magnetically attractive and therefore adapted to have the metallic rims 140 of the wheels 148 of motorized carrier 132 attracted thereto even when the enclosure is disposed in a vertical position.

Figure 17:
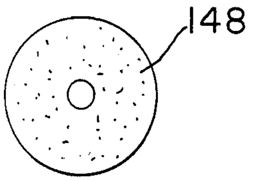
FIGS. 17 and 18 respectively show different embodiments of means by which the wheels of the motorized unit are maintained in operative position with respect to the front face of the enclosure.
Figure 18:
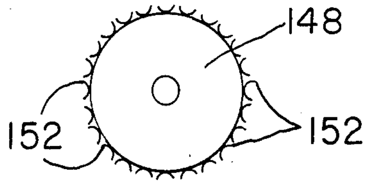

Referring to FIGS. 17 and 18 respectively, the same illustrate in side elevation examples of wheels 148 and 150, which respectively may be formed of plastic and have magnetized ferrous particles incorporated therethrough for attraction to the front faces of the enclosures 10 shown in FIGS. 19 and 20, whereas the wheels 148, shown in FIG. 18, have small suction cups 152 formed thereon for suction engagement with the outer faces of the enclosures 10.

Figure 21:
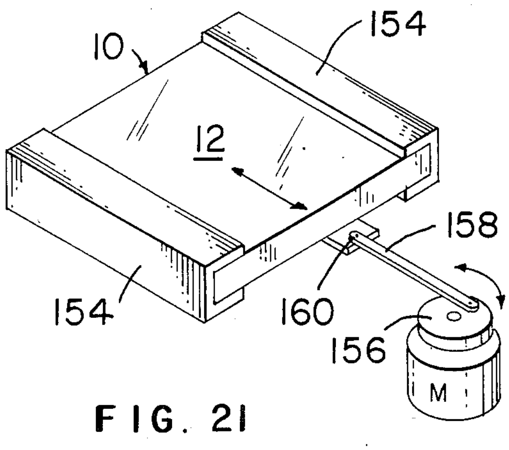

Referring to FIG. 21, there is illustrated therein additional means for destroying designs and images formed upon the front face 12 of enclosure 10, for example. In said figure, it will be seen that opposite edges of the enclosure 10 are slidably mounted within channel-like guide members 154, which are secured to any appropriate type of base and a motorized crank disc 156 has one end of a link 158 rotatably connected to the crank thereof and the opposite end of said link is pivotally connected to ear 160, for example, extending from one edge of enclosure 10. The motor of the motorized crank disc 156 preferably is of reversible nature and may be rotated respectively in a selected direction to rapidly reciprocate the enclosure 10, and thereby agitate the particles and fragments therein to cause redistribution of the same upon the inner surface of the front face 12 thereof upon which designs and images are to be formed by use of the magnetic tracing device 34, for example.

Figure 22:
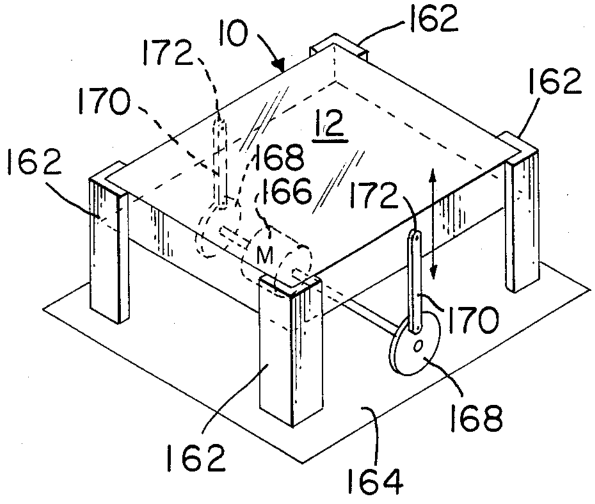
FIGS. 21 and 22 respectively show means for reciprocating an enclosure in opposite horizontal directions for purposes of destroying a previously formed figure and re-establishing the particles within the enclosure against the inner surface of the front face of the enclosure, and guide means engageable with corners of an enclosure and guide the same for vertical movement within said guide means effected by motorized crank means for purposes of destroying a figure and re-establishing a continuous layer of the material within the enclosure upon the inner surface of the upper face thereof.

Referring to FIG. 22, the exemplary enclosure 10 is shown as being rectangular in nature and the corners thereof are disposed in vertical guide channels 162 affixed to and extending upward from an appropriate base 164. Mounted upon the base is motor 166 having a shaft extending in opposite directions therefrom and respectively having the ends connected to crank discs 168. Links 170 respectively are connected at one end to crank pins 172 upon the discs 168 and the opposite ends are connected to pins 172 respectively on opposite sides of enclosure 10. By revolving the crank discs 168, the enclosure 10 is caused to be reciprocated vertically with respect to base 164, preferably rapidly, and thereby effect destruction of any design or image previously formed thereon and thereby also redistribute the particles and fragments mixed within the enclosure 10 and dispose the same in a substantially even manner upon the inner surface of the front face 12 of enclosure 10.

From the foregoing, it will be seen that the present invention provides mechanism which is highly suitable for use in various fields of activity and objects of different natures, such as toys, amusement devices, in sign-making activity, in use as substitutes for blackboards and whiteboards, useful in scorekeeping, various kinds of advertising devices, as teaching aids, and even as notepads, and the like. The principal aim of the invention is to provide means not only for forming designs and images of a magnetic tracing nature, but in particular, affording ready means for destroying such designs and images formed upon the inner surface of the front face, for example, of enclosures within which mixtures of nonmagnetic fragments and magnetic attractive particles are formed and result in the re-establishment of a layer of such mixture which is attracted to the inner surface of the front face, for example, of an enclosure of said material. Various forms and shapes of the enclosures are possible for different uses in various fields of activity and all of the embodiments thereof, in general, are readily capable of being manufactured easily, including the assembly thereof.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A tracing apparatus comprising in combination, an enclosure of geometric configuration and having at least one transparent surface area, said enclosure containing pulverulent nonmagnetic particles disposed to adhere to the inner surface of said area admixed with magnetically attractive fragments, a permanent magnetic tracing device slidably movable over the outer surface of said area of said enclosure and attracting certain of said magnetically attractive particles toward said device as it is moved over said area and cause the magnetically attractive particles attracted thereto to move along the inner surface of said enclosure and remove from said inner surface a pattern of said nonmagnetic particles to form a design image where the attracted particles removed the nonmagnetic particles from the inner surface of said surface area, and means supporting said enclosure for rotation about an axis when it is desired to remove said pattern from the inner surface of said enclosure and re-establish a substantially uniform layer over the inner surface of said enclosure a continuous layer of said mixture of nonmagnetic and magnetically attracted particles and fragments.

2. The tracing apparatus according to claim 1 wherein said enclosure is substantially rectangular and includes hinge means along one edge fastenable to a supporting surface such as a wall and said enclosure is pivotally movable in opposite directions upon the axis of said hinge means.

3. The tracing apparatus according to claim 1 and further including a supporting panel and hinge means connecting one edge of said enclosure to said panel which supports said enclosure while the same is being moved in opposite directions about the axis of said hinge means relative to said panel.

4. The tracing apparatus according to claim 1 further including a supporting frame within which said enclosure is positioned, and supporting trunnions positioned between opposite sides of said frame and enclosure about the axis of which trunnions said enclosure is rotatable relative to said supporting frame.

5. The tracing apparatus according to claim 4 in which said frame has hinge means along one edge which is transverse to said trunnions and said hinge means being connectable to a vertical supporting surface, whereby said frame is pivotable upon said hinges to dispose said frame perpendicular to said supporting surface to permit said enclosure to be pivoted about the axis of said trunnions.

6. The tracing apparatus according to claim 4 further including free-standing support means connected to and extending downward from the bottom edge of said supporting frame.

7. The tracing apparatus according to claim 1 in which said enclosure is a polygon having a central axis about which said enclosure is rotatable.

8. The tracing apparatus according to claim 7 in which said enclosure is a cylinder.

9. The tracing apparatus according to claim 7 further including a supporting frame having upstanding support members spaced apart and rotatably receiving therebetween said rotatable polygon.

10. The tracing apparatus according to claim 9 in which bearing means connect the ends of said polygon to said upstanding support means.

11. The tracing apparatus according to claim 10 further including rotatable means connected to one of the ends of said rotatable polygon and operable to rotate the same about its axis in either selected rotary direction.

12. The tracing apparatus according to claim 7 in which said enclosure has flexible cylindrical walls and is inflated by fluid sealed therein under pressure greater than atmospheric.

13. The tracing apparatus according to claim 12 in which the pressure of said sealed fluid is within a pressure range between ½ pound and 50 pounds per square inch.

14. The tracing apparatus according to claim 7 in which said enclosure has an opening at one end sealed by a cap removably connected in sealing relationship over said opening, and said cap also comprising a manually-engageable means by which said enclosure is rotatable about its axis.

15. The tracing apparatus according to claim 14 further including an upstanding support having a bearing therethrough and said opening in said end of said enclosure comprises a tubular neck supported within said bearing for rotation by said cap.

16. The tracing apparatus according to claim 1 in which said permanent magnet tracing device has a manually-engageable handle to which a permanent magnet is fixed with the magnet axis of orientation coaxial with said handle and affixed to one end thereof, whereby the magnetic force of said magnet is applicable when the device is between a perpendicular relation to the drawing area and up to 30 degrees from perpendicular.

17. The tracing apparatus according to claim 16 in which the magnetic peak energy of the magnet is within the range of between 3 and 50 Mega gauss oersteds.

18. The tracing apparatus according to claim 1 wherein the inner surface of said area of said enclosure upon which sketching is made is coated with an antistat agent to increase the removal of particles and fragments from said inner surface by said tracing device when moved over the outer surface of said area.

19. The tracing apparatus according to claim 18 in which said antistat agent also is mixed with a chemical agent and/or a metal substance.

20. The tracing apparatus according to claim 1 in which the enclosure has opposite planar substantially transparent surface members spaced apart and integrally connected to sidewalls around the peripheries of said members to form an air-tight interior in which said nonmagnetic particles and magnetically attractive fragments are contained, one of said planar members having an outer surface upon which a design or image is to be drawn as described, and the interior surface of the other planar member being treated with an antistat material to repel the adherence of said particles and fragments thereto.

21. The tracing apparatus according to claim 1 in which at least the surface upon which a figure is to be drawn comprises a transparent plastic sheet having a tensile stress within a range of between 1 and 50,000 p.s.i.

22. The tracing apparatus according to claim 1 in which the inner surface of the area of the enclosure opposite that upon which a tracing is formed is suitably colored, whereby the color of said inner surface is viewable through the design formed upon the area upon which a tracing has been formed.

23. The tracing apparatus according to claim 1 further including a brush extending between opposite sides of and housed within said enclosure and having a magnetically attractive element on one end movable interiorly along an elongated enclosed channel extending along one sidewall of said enclosure and operable with an exterior permanent magnet when moved along the exterior surface of said enclosed channel for magnetic engagement of said element on said brush to effect movement of said brush within said enclosure including rotary movement by means of rotating said exterior magnet.

24. The tracing apparatus according to claim 1 in which the magnetically attractive material within said enclosure comprises within a range of 0.0001% to 95% of the pulverulent nonmagnetic material within said enclosure.

25. The tracing apparatus of claim 24 where the particles have one or a combination of the following shape properties: spherical, acicular, angular, fragmented, irregular, granular, dendritic and abrasive.

26. The tracing apparatus of claim 25 where a charge agent is added.

27. The tracing apparatus according to claim 1 wherein the nonmagnetic pulverulent material comprises particles selected from the group of plastics: polyethylene, polystyrene and polyvinyl chloride.

28. The tracing apparatus according to claim 1 wherein the pulverulent particles of nonmagnetic material are selected from the group: brass, bronze, carbon, ceramic, chrome, clay, copper, copper-oxide, iron-oxide, nickel, silica, stainless steel, tin and zinc.

29. The tracing apparatus according to claim 28 in which said particles of nonmagnetic material are coated with a material of the group comprising: saturated fatty acid, unsaturated fatty acid, wax, polymers and chemicals.

30. The tracing apparatus according to claim 1 in which said particles of nonmegnatic material within said enclosure are coated with an antistat material.

31. The tracing apparatus according to claim 1 wherein the area of the enclosure upon which a design is to be formed has a film attached to one of the surfaces thereof to enhance the image formed upon said area.

32. The tracing apparatus according to claim 31 in which said film has an antistat material applied to one surface thereof.

33. The tracing apparatus according to claim 1 wherein said enclosure comprises a planar surface area upon which designs and images are to be formed and an opposite translucent surface spaced therefrom, said surfaces being connected to side members to form said enclosure, said opposite translucent surface being colored, and a lighting element mounted to direct light through said translucent surface to highlight the designs when formed upon said aforementioned planar surface.

34. The tracing apparatus of claim 1 where the drawing surface is compounded with antistatic agents or antistatic chemicals.

35. The tracing apparatus of claim 1 where the inner and/or outer drawing surfaces are metallized.

36. The tracing apparatus of claim 1 where the magnet is supported and is moved mechanically and electronically by a remote controller.

37. The tracing apparatus of claim 1 where the particles are mixed with a liquid or gel.

38. The tracing box or shape of claim 1 where the drawing surface is erased with pulverulent or liquid material, that is fluidized with gases or liquids from a fan, or mechanically with pulverulent or liquid material, falling over drawing surface, from a conveyor or elevator, or brush or other mechanical device.

39. The tracing box or shape of claim 1 where the drawing surface is erased with a liquid, moved by a pump or manually, flowing over the drawing surface.

40. The tracing box or shape of claim 1 where iron is alloyed with magnetically unattractive material.

41. The tracing box or shape of claim 1 where the tracing box is supported and the drawing surface is erased by moving box up and down, or back and forth, or side to side, or by rotating it 360 degrees or by vibrating.

42. A tracing apparatus comprising in combination, an enclosure of geometric configuration and having at least one transparent surface area, said enclosure containing pulverulent nonmagnetic particles disposed to adhere to the inner surface of said area admixed with magnetically attractive fragments, a permanent magnetic tracing device slidably movable over the outer surface of said area of said enclosure and attracting certain of said magnetically attractive particles toward said device as it is moved over said area and cause the magnetically attractive particles attracted thereto to move along the inner surface of said enclosure and scrape from said inner surface a pattern of said nonmagnetic particles to form a transparent design, said tracing device being motorized and having wheels provided with magnetized rims and said enclosure having incorporated in a wall of said enclosure upon which said surface area is located magnetically attractive elements to which the magnetized rims of said wheels are attracted as the motor of said device rotates said wheels, and a remote control unit complementary with controls on said motor of said tracing device to effect movement of said tracing device over said surface area of said enclosure and form an image thereon.

43. A tracing apparatus comprising in combination, an enclosure of geometric configuration and having at least one transparent surface area, said enclosure containing pulverulent nonmagnetic particles disposed to adhere to the inner surface of said area admixed with magnetically attractive fragments, a permanent magnetic tracing device slidably movable over the outer surface of said area of said enclosure and attracting certain of said magnetically attractive particles toward said device as it is moved over said area and cause the magnetically attractive particles attracted thereto to move along the inner surface of said enclosure and scrape from said inner surface a pattern of said nonmagnetic particles to form a transparent design, said tracing device being motorized and having wheels provided with magnetized rims and said enclosure having over said wall upon which said surface area is formed a thin transparent magnetically attractive sheet adhered thereto and to which the magnetized rims of said wheels are attracted as the motor of said device rotates said wheels, and a remote control unit complementary with controls on said motor of said tracing device to effect movement of said tracing device over said surface area of said enclosure and form an image thereon.

44. A tracing apparatus comprising in combination, an enclosure of geometric configuration and having at least one transparent surface area, said enclosure containing pulverulent nonmagnetic particles disposed to adhere to the inner surface of said area admixed with magnetically attractive fragments, a permanent magnetic tracing device slidably movable over the outer surface of said area of said enclosure and attracting certain of said magnetically attractive particles toward said device as it is moved over said area and cause the magnetically attractive particles attracted thereto to move along the inner surface of said enclosure and scrape from said inner surface a pattern of said nonmagnetic particles to form a transparent design, means supporting said enclosure between vertical guide members at spaced locations on the perimeter of said enclosure, and mechanical motorized means operable to move said enclosure rapidly in opposite vertical directions to remove the formed pattern and reestablish a substantially uniform coating over the inner surface of said enclosure upon which an image was formed.

45. A tracing apparatus comprising in combination, an enclosure of geometric configuration and having at least one transparent surface area, said enclosure containing pulverulent nonmagnetic particles disposed to adhere to the inner surface of said area admixed with magnetically attractive fragments, a permanent magnetic tracing device slidably movable over the outer surface of said area of said enclosure and attracting certain of said magnetically attractive particles toward said device as it is moved over said area and cause the magnetically attractive particles attracted thereto to move along the inner surface of said enclosure and scrape from said inner surface a pattern of said nonmagnetic particles to form a transparent design, means supporting said enclosure between an opposite pair of parallel horizontal guides slidably receiving opposite edges of said enclosure, and mechanical motorized means connected to one end of said enclosure and operable to reciprocate the same horizontally and rapidly in opposite directions and thereby remove said formed pattern and re-establish a substantially uniform coating over the inner surface of said enclosure upon which an image was formed.

* * * * *